(12) United States Patent
Iwasaki

(10) Patent No.: US 9,927,011 B2
(45) Date of Patent: Mar. 27, 2018

(54) BALL SCREW

(71) Applicant: KURODA PRECISION INDUSTRIES LTD., Kanagawa (JP)

(72) Inventor: Yoshimi Iwasaki, Chiba (JP)

(73) Assignee: KURODA PRECISION INDUSTRIES LTD., Kanagawa (JP)

( * ) Notice: Subject to any disclaimer, the term of this patent is extended or adjusted under 35 U.S.C. 154(b) by 0 days.

(21) Appl. No.: 15/502,558

(22) PCT Filed: Aug. 12, 2014

(86) PCT No.: PCT/JP2014/004180
§ 371 (c)(1),
(2) Date: Feb. 8, 2017

(87) PCT Pub. No.: WO2016/024302
PCT Pub. Date: Feb. 18, 2016

(65) Prior Publication Data
US 2017/0227098 A1 Aug. 10, 2017

(51) Int. Cl.
*F16H 25/00* (2006.01)
*F16H 25/22* (2006.01)

(52) U.S. Cl.
CPC ................ *F16H 25/2219* (2013.01)

(58) Field of Classification Search
CPC .................................. F16H 25/2219
See application file for complete search history.

(56) References Cited

U.S. PATENT DOCUMENTS 3,367,201 A * 2/1968 Orner .................. F16H 25/2214
74/424.86
3,399,581 A * 9/1968 Valenti ................ F16H 25/2015
74/424.86
3,512,426 A 5/1970 Dabringhaus
4,226,137 A * 10/1980 Sharp .................. F16H 25/2223
74/424.86

(Continued)

FOREIGN PATENT DOCUMENTS

JP 4783511 8/1983
JP S 58-36922 8/1983

(Continued)

OTHER PUBLICATIONS

Japanese Patent Office JP-2014-555891—Office Action, dated Jun. 30, 2015. (3 pages) English Translation Not Available.

(Continued)

*Primary Examiner* — David M Fenstermacher
(74) *Attorney, Agent, or Firm* — Dority & Manning, P.A.

(57) ABSTRACT

In a ball screw (1), the positioning of the deflectors to the nut is facilitated, and the deflectors are prevented from being dislodged in the radially outward direction from the nut. The ball screw (1) includes a screw shaft (3), a nut (7), a pair of deflectors (13) inserted in respective receiving holes (14) of the nut and a plurality of balls (8). The nut (7) is provided with a guide portion (42) configured to cooperate with a corresponding guide portion (41) provided on the deflector (13) so that the insertion of the deflector (13) into the respective receiving holes (14) is guided in a direction at an angle to the radial direction of the nut.

8 Claims, 18 Drawing Sheets

(56) References Cited

U.S. PATENT DOCUMENTS

| | | | | |
|---|---|---|---|---|
| 5,373,755 A | * | 12/1994 | Rohlinger | F16H 25/2214 |
| | | | | 74/424.86 |
| 2001/0022110 A1 | | 9/2001 | Roland | |
| 2005/0126324 A1 | * | 6/2005 | Yang | F16H 25/2219 |
| | | | | 74/424.86 |
| 2007/0186708 A1 | * | 8/2007 | Liao | F16H 25/2219 |
| | | | | 74/424.86 |
| 2013/0239725 A1 | * | 9/2013 | Miyazaki | F16H 25/2214 |
| | | | | 74/424.86 |

FOREIGN PATENT DOCUMENTS

| | | |
|---|---|---|
| JP | H 10110801 | 4/1998 |
| JP | 2001289302 | 10/2001 |
| JP | 2002227954 | 8/2002 |
| JP | 2003113921 | 4/2003 |
| JP | 2006105388 | 4/2006 |
| JP | 2007024305 | 2/2007 |
| JP | 2012184824 | 9/2012 |
| JP | 2014016039 | 1/2014 |

OTHER PUBLICATIONS

International Search Report PCT/JP2014/004180, dated Sep. 9, 2014 (6 pages).
Koren Office Action dated Mar. 9, 2017, 6 pages.
Chinese Office Action dated Aug. 2, 2017, 8 pages.

* cited by examiner

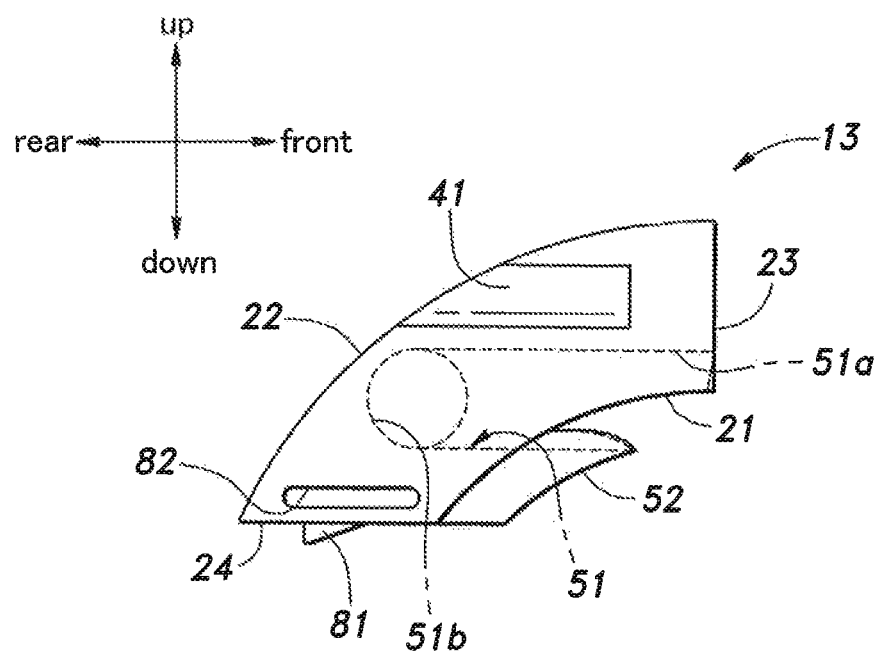

BALL SCREW

CROSS REFERENECE TO RELATED APPLICATIONS

This application is the U.S. National Stage entry of International Application No. PCT/JP2014/004180 filed under the Patent Cooperation Treaty having a filing date of Aug. 12, 2014, the disclosure of which is hereby incorporated by reference herein in its entirety for all purposes.

TECHNICAL FIELD

The present invention relates to a ball screw that can convert a rotational motion into a linear motion and a linear motion into a rotational motion, and can be used for power transmission and positioning purposes.

BACKGROUND ART

In a conventionally known ball screw, a ball rolling passage is jointly defined by a thread groove formed on the outer circumferential surface of a screw shaft and a thread groove formed on the inner circumferential surface of a nut, and a plurality of balls (rigid balls) are received in this ball rolling passage. The ball screw is typically used for converting a rotational motion of an electric motor into a linear motion with a high transmission efficiency and a high precision. During the operation of the ball screw, it is necessary for the balls received in the ball rolling passage to circulate. A typical arrangement for circulating the balls consists of an end deflector system in which a ball return passage for circulating the balls is formed on the side of the nut, and each end of the ball return passage is fitted with an end deflector (circulation member) for scooping up the balls from the ball rolling passage to the ball return passage and returning the balls from the ball return passage back to the ball rolling passage.

The known structures based on the end deflector system or other systems for circulating the balls include the arrangement where an end deflector is fitted into a receiving hole formed on each axial end of the nut from an axial direction (See Patent Document 1) and the arrangement where a deflector (side deflector) is fitted into each of a pair of receiving holes formed in axially intermediate points of the nut (peripheral wall) from a radial direction (See Patent Document 2).

PRIOR ART DOCUMENT(S)

Patent Document(s)

Patent Document 1: JP2007-024305A
Patent Document 2: JP4783511B

SUMMARY OF THE INVENTION

Task to be Accomplished by the Invention

In the conventional ball screw in which the end deflectors are attached to the nut in the axial direction as disclosed in Patent Document 1, engagement means (such as a hole extending in the axial direction and a projection fitted into the hole) for preventing the inadvertent removal of each end deflector in the radially outward direction in cooperation with a fixing member (such as a pin and a screw) may be provided on each of the nut and the end deflector without involving any significant difficulty. However, in the case of the conventional ball screw in which each side deflector is inserted into the nut in the radial direction as disclosed in Patent Document 2, some difficulty is encountered in providing engagement means (excluding the fixing member) for preventing the dislodgement of the side deflector in the radially outward direction owing to structural reasons. In particular, when the nut rotates, the side deflectors are subjected to a centrifugal force directed in the radially outward direction or in the removal direction of the side deflectors. Therefore, in the case of a ball screw in which the side deflectors are inserted into the nut in the radial direction, an appropriate arrangement for preventing the removal of the side deflectors in the radially outward direction is highly essential.

In the case of a conventional ball screw in which each side deflector is assembled to the peripheral wall of the nut in the radial direction as disclosed in Patent Document 2, because the assembling of the side deflector is aided by the guiding action of the inner circumferential surface of the receiving hole, the entire side surface (circumferential surface) of the inner wall defining the receiving hole and the corresponding entire side surface of the side deflector are required to be finished at high precision in order to allow the positioning of the side deflector to the nut to be performed at high precision without complicating the assembling process.

The present invention was made in view of such problems of the prior art, and has a primary object to provide a ball screw which can effectively prevent the circulation member from being dislodge in the radially outward direction from the nut.

Means to Accomplish the Task

The first aspect of the present invention provides a ball screw (1), comprising: a screw shaft (3) having a thread groove (2) formed on an outer circumferential surface thereof; a nut (7) having a cylindrical peripheral wall (4), a thread groove (6) formed on an inner circumferential surface of the peripheral wall to define a ball rolling passage (5) jointly with the thread groove of the screw shaft, a ball return passage (12) extending in the peripheral wall to connect two ends of the ball rolling passage with each other and at least one receiving hole (14) formed in the peripheral wall;

a circulation member (13) inserted in the receiving hole and defining a circulation passage (51) for connecting an end of the ball rolling passage with a corresponding end of the ball return passage; and a plurality of balls (8) received in a ball passage jointly formed by the ball rolling passage, the ball return passage and the circulation passage;

wherein the nut is formed with at least one guide portion (42, 142) configured to cooperate with a corresponding guide portion (41, 141) formed in the circulation member for guiding an inserting movement of the circulation member into the receiving hole in an insertion direction crossing a radial direction of the nut.

According to the first aspect of the present invention, because the circulation member is inserted into the nut in the insertion direction at an angle to the radial direction of the nut, the dislodgement of the circulation member in the radially outward direction can be favorably prevented.

The second aspect of the present invention is characterized by that the nut is further provided with at least one contact portion (31) for defining an insertion limit of the inserting movement of the circulation member into the receiving hole in cooperation with a corresponding contact portion (23) provided on the circulation member.

According to the second aspect of the present invention, the insertion limit of the inserting movement of the circulation member into the receiving hole is determined by the contact portion and the corresponding contact portion such that the positioning of the circulation member with respect to the nut is facilitated during the assembling process.

The third aspect of the present invention is characterized, in conjunction with the first or the second aspect of the present invention, by that the peripheral wall is formed with a first fixing hole (56) extending at an angle to the insertion direction and opening out into the receiving hole, and the circulation member is formed with a second fixing hole (55) communicating with the first fixing hole in the receiving hole when the circulation member is inserted into the receiving hole, the ball screw further comprising a fixing member (61) passed from the first fixing hole to the second fixing hole.

According to the third aspect of the present invention, because the fixing holes for accepting the fixing member (such as a pin, a screw and a bolt) for fixedly securing the circulation member extends at an angle to the insertion direction of the circulation member, the movement of the circulation member in the direction opposite to the insertion direction can be effectively prevented so that the circulation member can be fixedly secured to the nut with the fixing member in a more stable manner.

The fourth aspect of the present invention is characterized, in conjunction with the third aspect of the present invention, by that the first fixing hole and the second fixing hole extend at angle to the radial direction of the nut.

According to the fourth aspect of the present invention, because the first fixing hole and the second fixing hole extend at angle to the radial direction of the nut, the movement of the circulation member in the radially outward direction or in the removal direction can be effectively prevented when the circulation member is fixedly secured to the nut (or when the fixing member is being inserted into the fixing holes).

The fifth aspect of the present invention is characterized, in conjunction with the first or the second aspect of the present invention, by that an engagement claw (81) is formed in one of the inner wall of the receiving hole and the circulation member, and an engagement opening (75) is formed in the other of the inner wall of the receiving hole and the circulation member in such a manner that the engagement claw is engaged by the engagement opening owing to an elastic deformation of at least a part of the circulation member when the circulation member is inserted into the receiving hole.

According to the fifth aspect of the present invention, no extra fixing member is required to be prepared for fixedly securing the circulation member in the nut, and the circulation member can be fixedly secured to the nut simply by pushing the circulation member into the receiving hole.

The sixth aspect of the present invention is characterized, in conjunction with any one of the first to the fifth aspects of the present invention, by that one of the guide portion and the corresponding guide portion comprises a groove (42, 142) extending in the insertion direction, and the other of the guide portion and the corresponding guide portion comprises a projection (41, 141) that engages the groove in a slidable manner in the insertion direction.

According to the sixth aspect of the present invention, because the guide portion and the corresponding guide portion are formed by a groove extending in the insertion direction and a projection engaging the groove, the insertion of the circulation member into the receiving hole can be guided with a simple structure.

The seventh aspect of the present invention is characterized, in conjunction with the sixth aspect of the present invention, by that the projection consists of a ridge extending in the insertion direction.

According to the seventh aspect of the present invention, because the guide portion and the corresponding guide portion are formed by a groove extending in the insertion direction and a ridge engaging the groove, the insertion of the circulation member into the receiving hole can be guided in an even more stable manner.

The eighth aspect of the present invention is characterized, in conjunction with the sixth aspect of the present invention, by that the projection is formed by a part of a guide member (72) fitted into a recess (71) provided in the other of the guide portion and the corresponding guide portion.

According to the eighth aspect of the present invention, because the guide member forming the projection can be easily replaced, the state of engagement between the groove and the projection (and the precision in the insertion of the circulation member into the receiving hole) can be adjusted without any difficulty.

The ninth aspect of the present invention is characterized, in conjunction with any one of the first to the eighth aspects of the present invention, by that the guide portion is formed on each of a pair of sides of the receiving hole that oppose each other in the axial direction, and the corresponding guide portions are provided on either side of the circulation member so as to correspond to the guide portions.

According to the ninth aspect of the present invention, because the guide portion is formed on each of a pair of sides of the receiving hole that oppose each other in the axial direction, and the corresponding guide portions are provided on either side of the circulation member so as to correspond to the guide portions, the circulation member can be inserted into the receiving hole in an even more stable manner so that the positioning of the circulation member with respect to the nut is significantly facilitated.

Effect of the Invention

According to the present invention, the circulation member of a ball screw can be prevented from being dislodge in the radially outward direction from the nut.

BRIEF DESCRIPTION OF THE DRAWINGS

FIG. 18 is a side view of the side deflector of the third modified embodiment.

DESCRIPTION OF THE PREFERRED EMBODIMENT(S)

Preferred embodiments of the present invention are described in the following with reference to the appended drawings.

Figure 1:
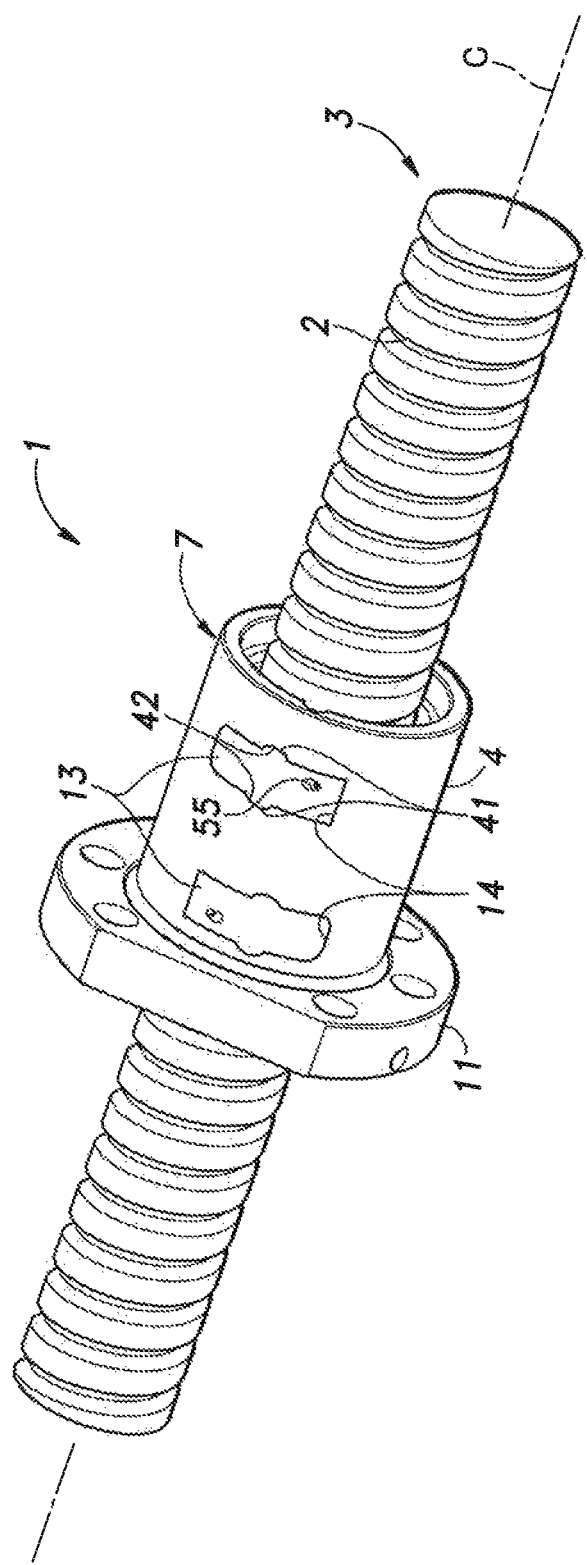
FIG. 1 is a perspective view of a ball screw embodying the present invention.
Figure 2:
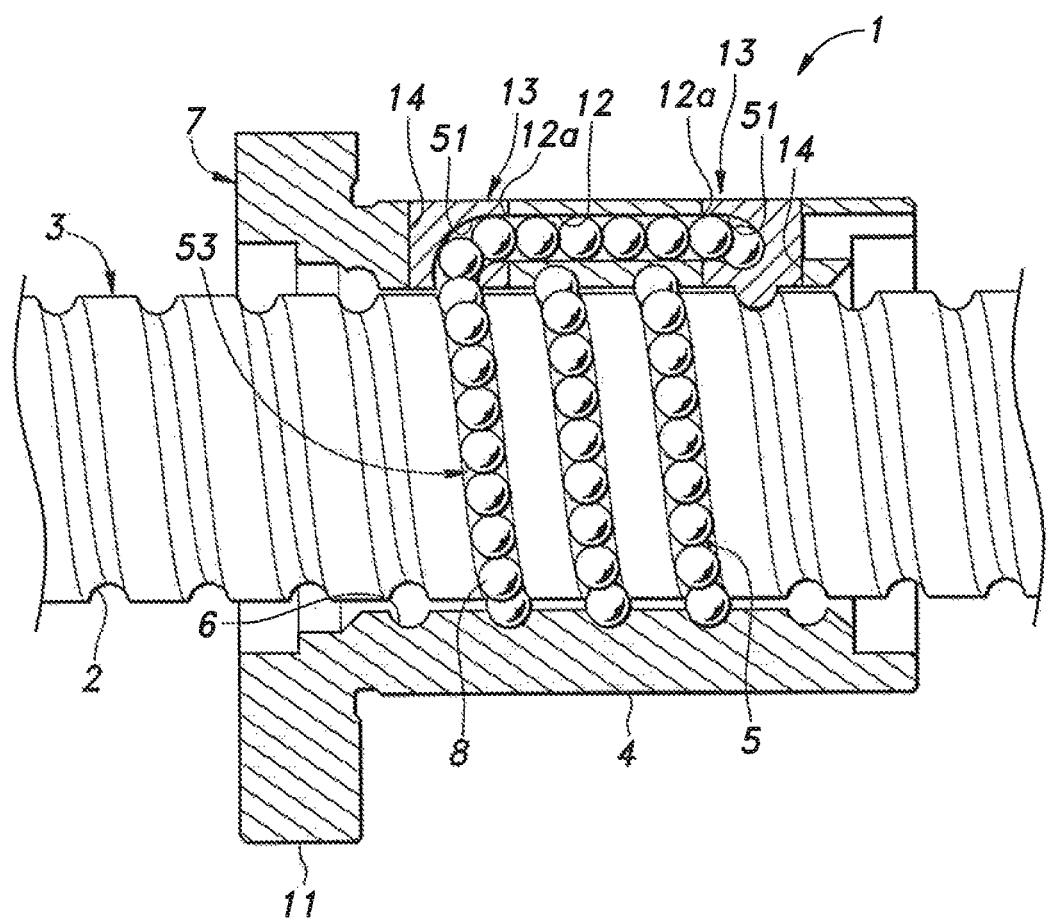
FIG. 2 is a fragmentary sectional view of the ball screw shown in FIG. 1.

FIGS. 1 and 2 are a perspective view and a fragmentary sectional view of a ball screw embodying the present invention. The ball screw 1 essentially consists of a screw shaft 3 having a spiral thread groove (screw shaft side thread groove) 2 formed on the outer circumference thereof, a nut 7 having a cylindrical peripheral wall 4 configured to receive the screw shaft 3 and formed with a thread groove (nut side thread groove) 6 on the inner circumferential surface of the peripheral wall 4 to define a ball rolling passage 5 (see FIG. 2) jointly with the screw shaft side thread groove 2, and a plurality of rigid balls 8 (see FIG. 2) received within the nut 7.

The screw shaft 3 is made by forming the thread groove 2 of a prescribed lead angle and a pitch on the outer circumferential surface of a rod member made of metallic material such as stainless steel. The nut 7 is made of metallic material similarly as the screw shaft 3, and is provided with a circular radial flange 11 in the front end of the peripheral wall 4. The nut side thread groove 6 is given with a spiral configuration so as to oppose the screw shaft side thread groove 2. The peripheral wall 4 is internally formed with a ball return passage 12 (see FIG. 2) having a circular cross section and extending linearly in the axial direction (see axial line C in FIG. 1). A pair of receiving holes 14 having an identical configuration for receiving respective identical side deflectors (circulation member) 13 are formed in axially intermediate parts of the peripheral wall 4 in an axially spaced apart relationship. As the two side deflectors 13 are identical to each other, only one of the side deflectors 13 may be discussed as a representative of the two in some part of the following disclosure. The material and the configuration of the screw shaft 3 and the nut 7 can be modified in various ways without departing from the spirit of the present invention.

Figure 3:
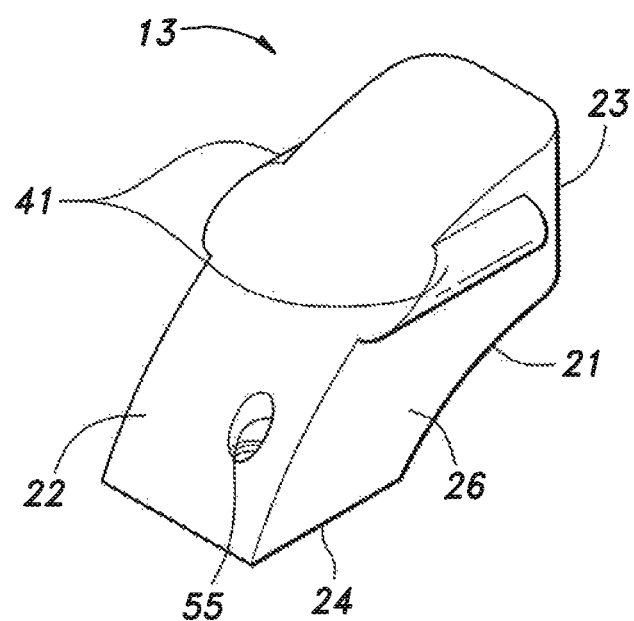
FIG. 3 is a perspective view showing the outer circumferential surface side of the side deflector of the illustrated embodiment.
Figure 4:
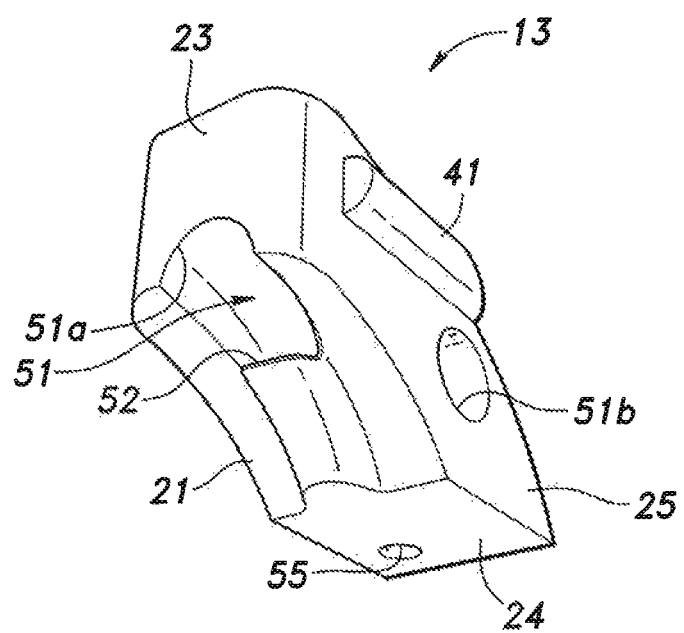
FIG. 4 is a perspective view showing the inner circumferential surface side of the side deflector of the illustrated embodiment.
Figure 5:
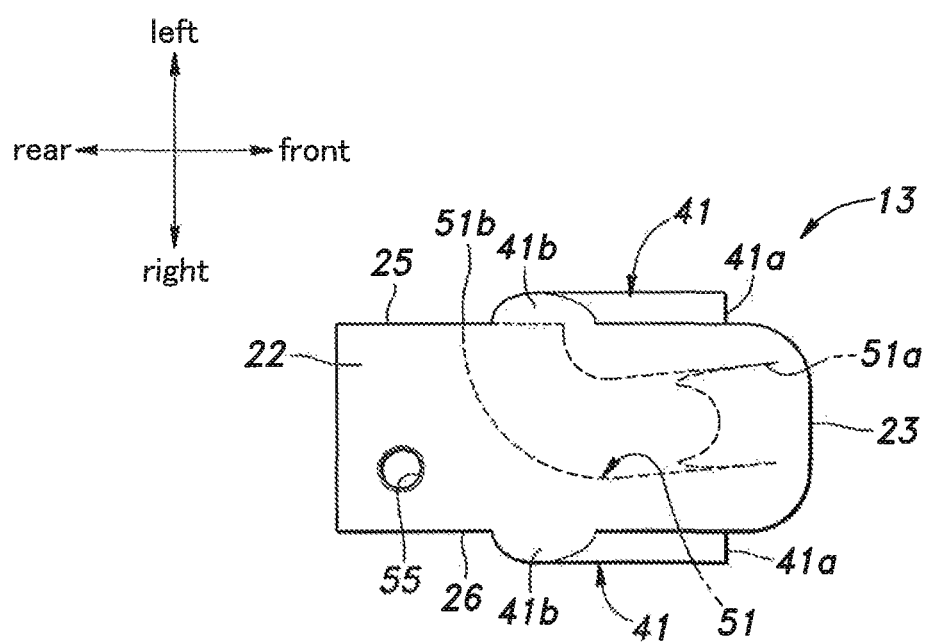
FIG. 5 is a plan view of the side deflector.
Figure 6:
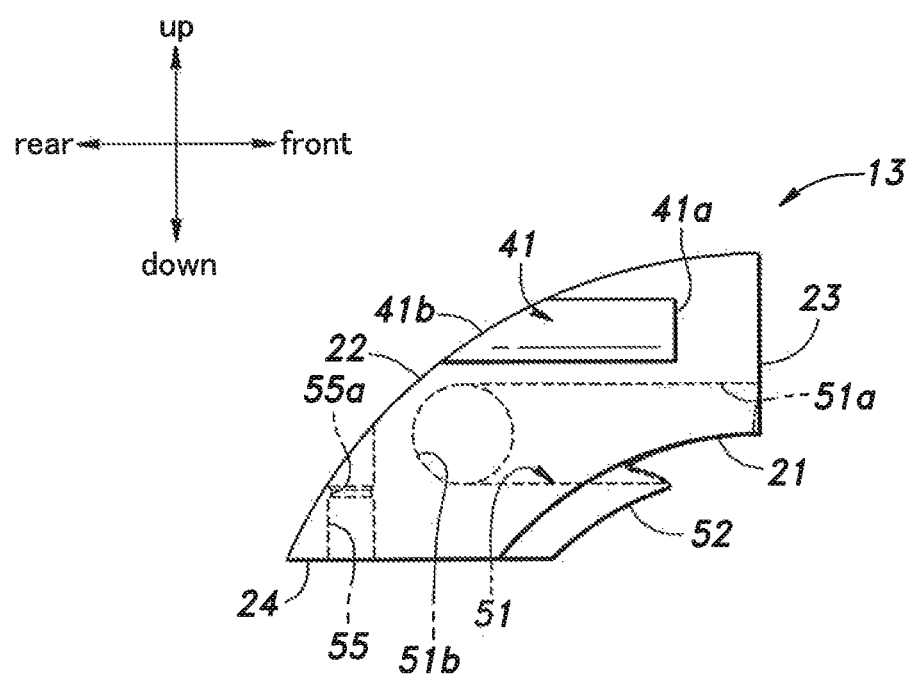
FIG. 6 is a side view of the side deflector.

FIGS. 3 and 4 are perspective views showing the side deflector from the outer circumferential surface side and the inner circumferential surface side thereof, respectively, and FIGS. 5 and 6 are a plan view and a side view of the side deflector, respectively.

The side deflector 13 is made by injection molding plastic material. The main body of the side deflector 13 is provided with a rectangular shape with two rounded corners (defined by the front surface 23 and the two side surfaces 25 and 26) (with a prescribed radius of curvature R) on either end of one of the sides (the front part of the main body) as seen in plan view (see FIG. 5). The main body is also provided with a shape defined by a pair of arcs positioned one outward of the other and a pair of lines each connecting the corresponding ends to each other in side view (FIG. 6). The main body of the side deflector 13 therefore includes an inner circumferential surface 21 and an outer circumferential surface 22 defining the respective arcs shown in the side view, a front surface (corresponding contact portion) 23 defining the front line in the side view, a bottom surface 24 defining the lower line in the side view, and a left side surface 25 and a right side surface 26 defining the left and right lines in the plan view, respectively. The lateral sides of the front surface 23 are curved so as to define the rounded shape (the two rounded corners) of the front part of the main body in the plan view.

As will be discussed hereinafter, each side deflector 13 can be fitted into the corresponding receiving hole 14 of the nut 7 substantially without creating any gap on the front surface 23, the bottom surface 24, the left side surface 25 and the right side surface 26. The two receiving holes 14 are formed with mutually reversed orientations along the circumferential direction (the fore and aft direction of the side deflector 13). The inner wall of each receiving hole 14 includes a front surface (contact portion) 31, a bottom surface 32, a left side surface 33 and the right side surface 34 (see FIG. 7) which correspond to the front surface 23, the bottom surface 24, the left side surface 25 and the right side surface 26 of the side deflector 13, respectively. The main part of each receiving hole 14 defined by these surfaces 31 to 34 can be formed by using a single work tool (without requiring the tool to be changed) so that the working process can be simplified, and the various surfaces 31 to 34 can be formed at high precision.

A ridge (corresponding guide portion) 41 or a bead extending in the longitudinal direction (or in parallel with the bottom surface 24) is formed on each of the left side surface 25 and the right side surface 26 of the side deflector 13. Each ridge 41 is provided with a semicircular cross section, and projects sideways from the corresponding side surface 25, 26 of the side deflector 13. As shown in the side view (of FIG. 6), each ridge 41 is provided with a front part (front surface) 41a which is located behind the front surface 23 by a prescribed distance, and a rear part (rear surface) 41b is shaped as an arcuate surface conforming to the contour of the outer circumferential surface 22. The two ridges 41 are symmetric to each other, but are otherwise identically shaped.

As will be discussed hereinafter, when the side deflector 13 is being fitted into the corresponding receiving hole 14 of the nut 7, the ridges 41 guide the side deflector 13 into the receiving hole 14 in cooperation with respective grooves (guide portions) 42 (see FIG. 7) formed on the side of the nut 7. The grooves 42 are formed by cutting away corresponding parts of the inner wall of the receiving hole 14 inward from the side of the outer circumferential surface of the peripheral wall 4. In particular, the grooves 42 are defined as recesses each having a semicircular cross section formed on the left side surface 33 and the right side surface 34 extending in parallel to each other in a mutually opposing relationship in the axial direction. The grooves 42 extend in a direction at an angle to the radial direction of the nut 7 (an imaginary line passing through the center O of the nut 7 in the sectional view shown in FIG. 11). As a result, when the nut 7 is rotating, the resulting centrifugal force is prevented from directly acting in the direction opposite to the insertion direction (or in the removal direction). The extending direction of the grooves 42 determines the insertion direction of the side deflector 13. The size of the semicircular cross section of each groove 42 is equal to or slightly greater than the size of the semicircular cross section of the corresponding ridge 41 so that the ridge 41 received in the groove 42 may slide in the groove 42 in the insertion direction of the deflector 13.

The shape, size and positioning of the ridges 41 are not limited to those shown here, but may be modified in various ways (and so are the grooves 42 into which the ridges 41 fit). Using geometric features (the grooves 42 and the ridges 41 in this case) that slidably engage with each other for guiding the insertion of the side deflectors 13 into the receiving holes 14 provides the advantage of achieving the guiding action for the side deflectors 13 by using a simple structure.

The feature (the ridge 41 in this case) that engages each groove 42 for guiding the side deflector 13 into the receiving hole 14 in the prescribed direction (the direction crossing the radial direction of the nut 7) is not required to extend in the longitudinal direction, but may also consist of one or a plurality of discrete projections (such as projections having a semi-spherical free end and having a semicircular cross section) projecting sideways without being elongated in the longitudinal direction. However, by using a groove 42 and a corresponding ridge 41 both extending in the prescribed insertion direction for guiding the side deflector 13 into the corresponding receiving hole 14 as is the case with the illustrated embodiment, the insertion of the side deflector 13 into the receiving hole 14 can be guided in a particularly stable manner.

A pair of ridges 41 are used in the illustrated embodiment, but more than two ridges 41 or a single ridge may also be used (and the same is true with the corresponding grooves 42). However, when the two ridges 41 are formed on the opposite sides (the sides corresponding to the left side surface 25 and the right side surface 26) and the corresponding grooves 42 are formed on the corresponding sides (the sides corresponding to the left side surface 33 and the right side surface 34) of the receiving hole 14, the side deflector 13 can be inserted into the receiving hole 14 in a stable manner so that the positioning of the side deflector 13 with respect to the nut 7 can be facilitated.

As shown in FIG. 5, the side deflector 13 is formed with a circulation passage 51 for connecting each end of the ball rolling passage 5 to the corresponding end of the ball return passage 12. The circulation passage 51 is provided with a circular cross section for permitting the passage of the balls 8 therein. As shown in FIG. 6, a tongue 52 for scooping up the balls 8 from the ball rolling passage 5 (or returning the balls 8 back to the ball rolling passage 5) is provided on the side of the inner circumferential surface of the side deflector 13. When the side deflector 13 is fitted in the receiving hole 14, the free end of the tongue 52 is located adjacent to the thread groove 2 of the screw shaft 3. An end part of the circulation passage 51 is formed with a groove 51a which is exposed in a part of the side deflector 13 on the side of the inner circumferential surface 21 located ahead of the tongue 52. The other end part of the circulation passage 51 is formed with a circular opening 51b which opens out on the left side surface 25 of the side deflector 13. The circulation passage 51 is connected to the opening 12a (see FIG. 2) on the corresponding end of the ball rolling passage 5 via this opening 51b.

In the side deflector 13, the balls 8 scooped up by the tongue 52 are guided along the lengthwise direction of the ball rolling passage 5 (obliquely in the rightward and rearward direction in FIG. 5), and then toward the ball return passage 12 in the leftward direction via the circulation passage 51 curving leftward. Meanwhile, the balls 8 returned to the ball rolling passage 5 via the tongue 52 move in the reverse direction to those scooped up by the tongue 52.

Owing to this structure, the balls 8 received in the ball passage 53 (see FIG. 2) formed by the ball rolling passage 5, the ball return passage 12 and the circulation passages 51 can roll and circulate in the ball passage 53 when the ball screw 1 is in operation.

As shown in FIG. 6, the side deflector 13 is formed with a fixing hole (second fixing hole) 55 extending vertically (in parallel with the front surface 23) and having a circular cross section. The fixing hole 55 is passed through the side deflector 13 from the outer circumferential surface 22 to the bottom surface 24. As will be discussed hereinafter, an intermediate part of the fixing hole 55 is provided with a narrowed portion (reduced diameter portion) 55a serving as a stopper for a fixing member for securing the side deflector 13 in position. The peripheral wall 4 of the nut 7 is formed with another fixing hole 56 (see FIG. 11) extending at an angle to the insertion direction of the side deflector 13 and opening out to the receiving hole 14 in such a manner that the two fixing holes 55 and 56 communicate with each other when the side deflector 13 is received in the receiving hole 14.

The plastic material for the side deflector 13 may be selected from per se known materials such as polyacetal resin, reinforced polyamide resin and other engineering plastic materials. The material for the side deflector 13 is not limited to plastic material, but may also consist of other per se known materials (such as metallic materials). The use of plastic material has the advantage of low manufacturing cost as compared to metallic material.

Figure 7:
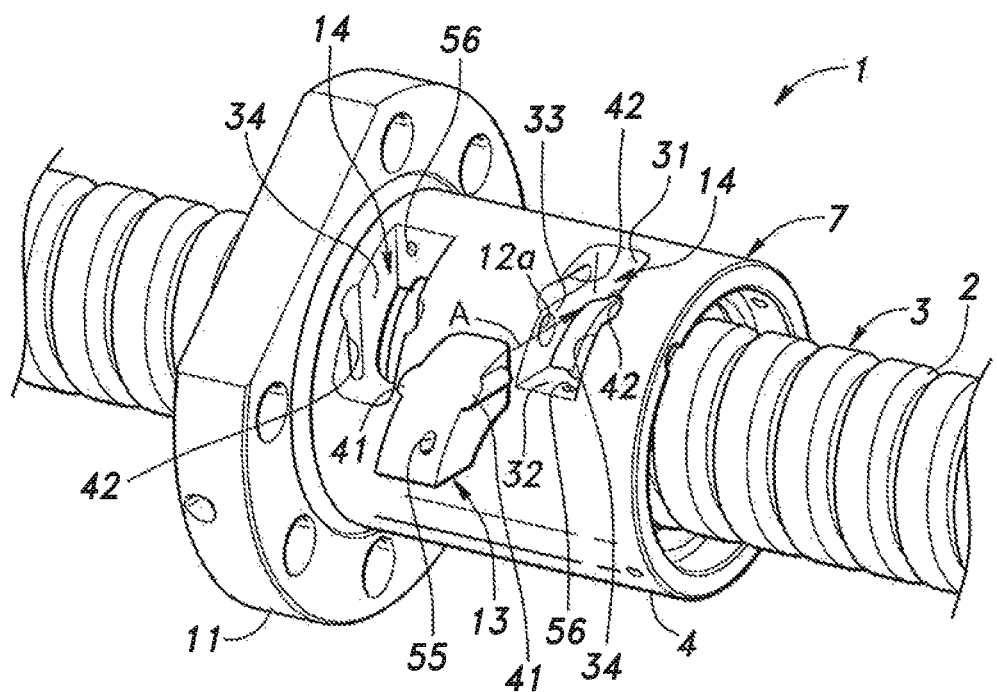
FIG. 7 is a view showing the mode of assembling the side deflector to the nut.
Figure 8:
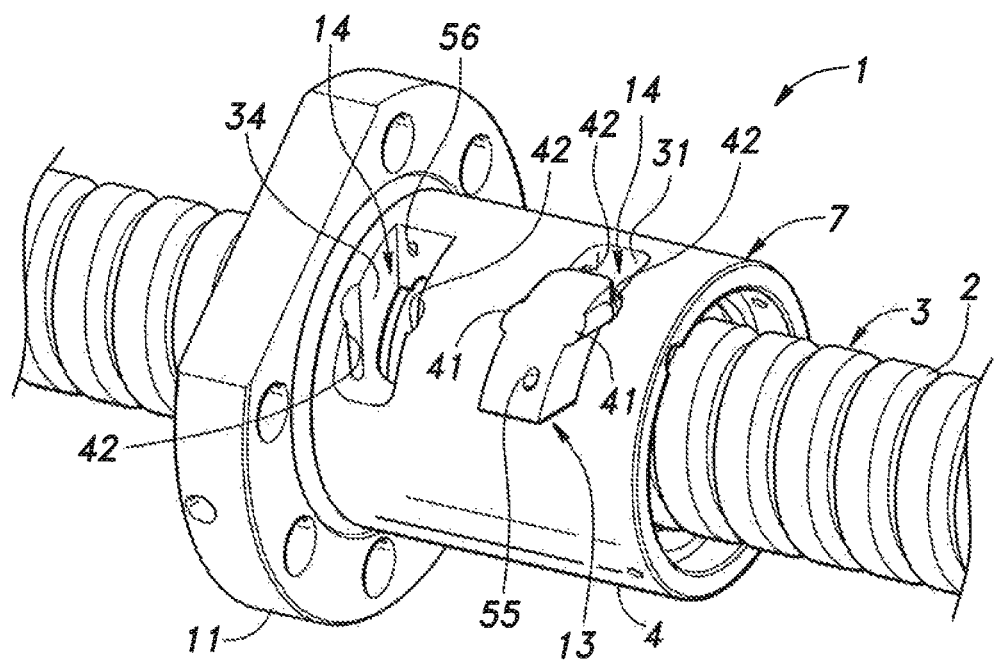
FIG. 8 is another view showing the mode of assembling the side deflector to the nut.
Figure 9:
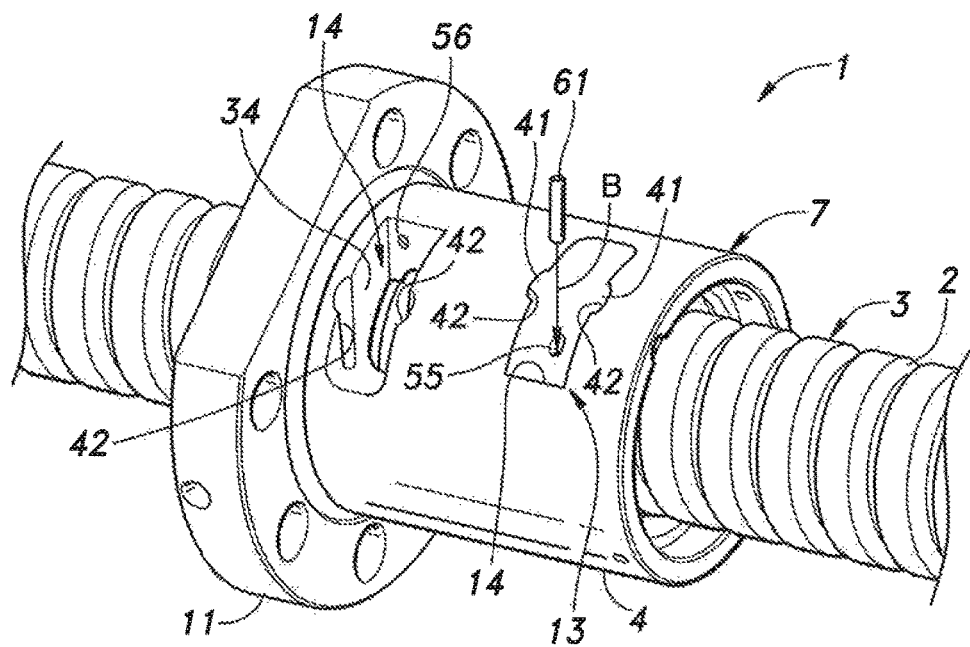
FIG. 9 is yet another view showing the mode of assembling the side deflector to the nut.
Figure 10:
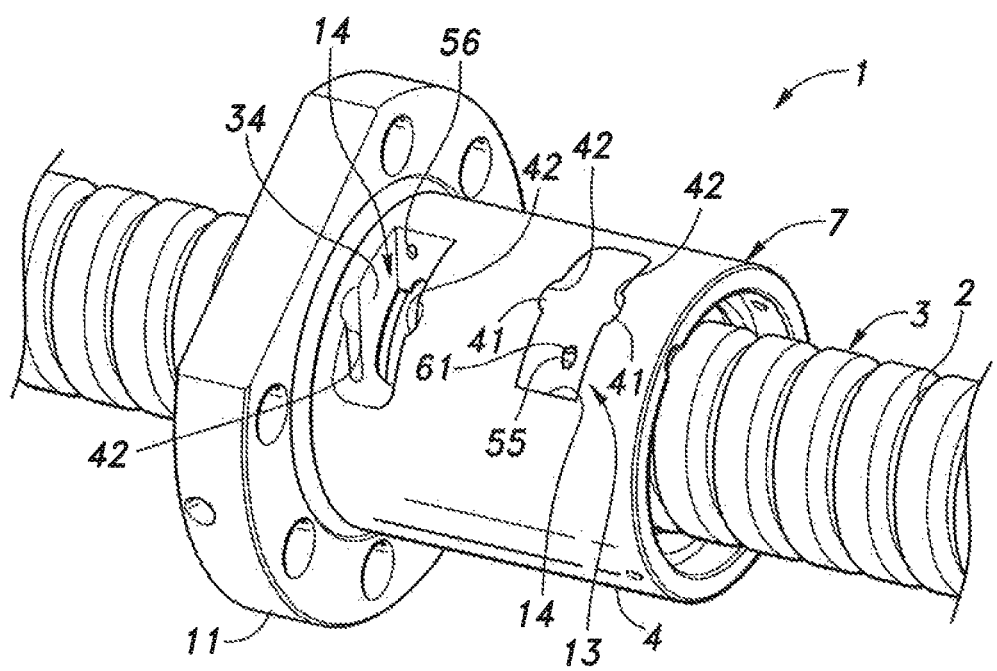
FIG. 10 is yet another view showing the mode of assembling the side deflector to the nut.
Figure 11:
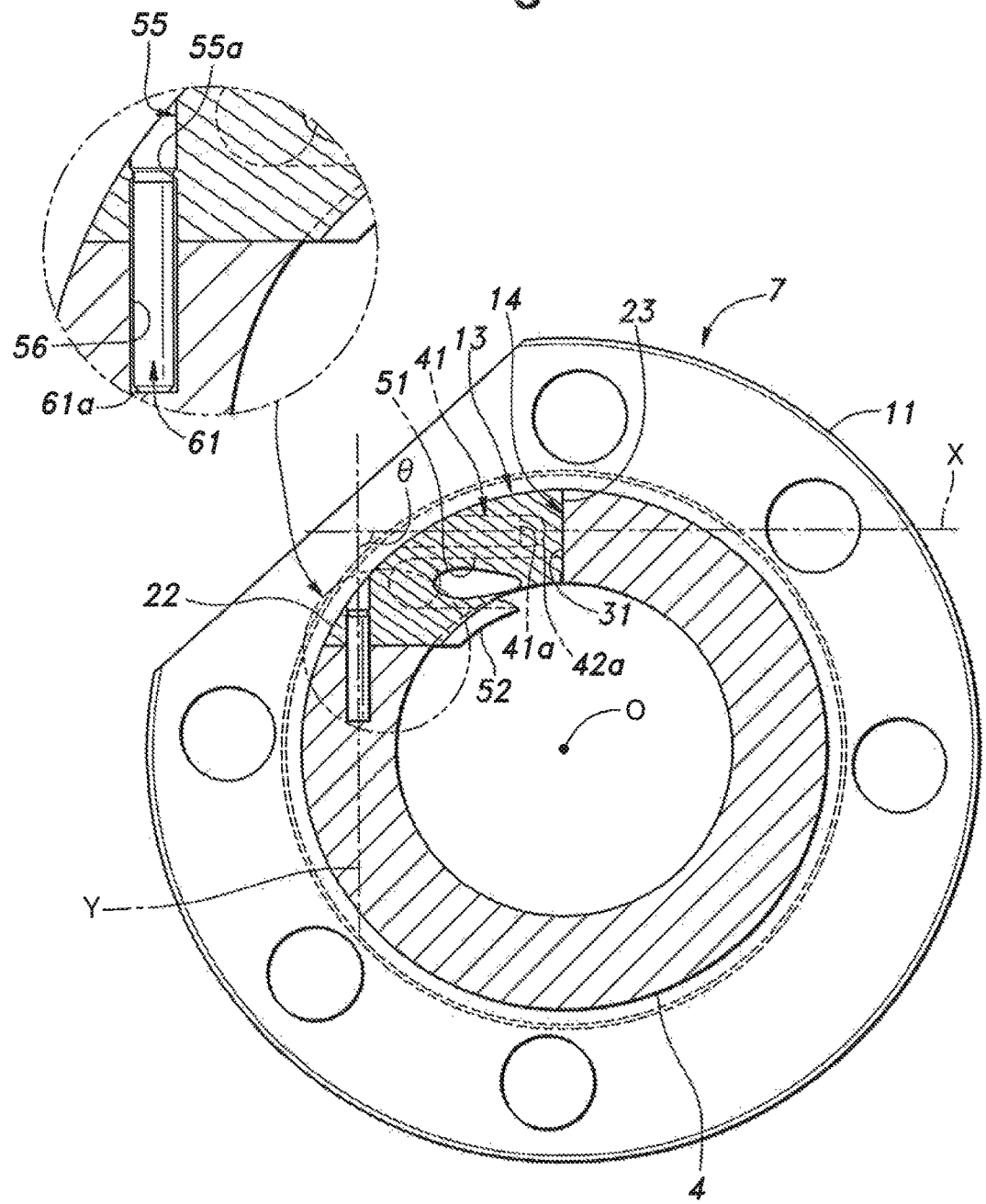
FIG. 11 is a sectional view of the nut.
Figure 12:
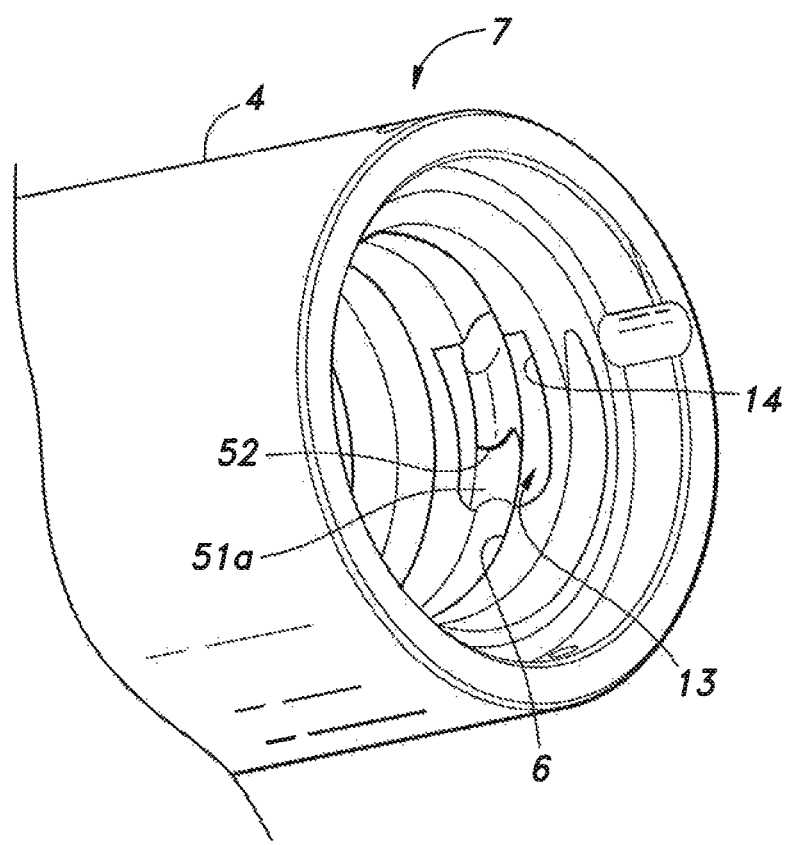
FIG. 12 is a fragmentary perspective view of the inner circumferential surface side of the nut.

FIGS. 7 to 10 are illustrative views showing the process of assembling the side deflectors 13 to the nut 7. FIGS. 11 and 12 are a sectional view of the nut 7 fitted with the side deflector 13 and a fragmentary perspective view showing the inner circumferential surface side of the nut 7, respectively. In particular, FIG. 7 shows the state where the side deflector 13 is not yet inserted in the receiving hole 14, FIG. 8 shows the state where the side deflector 13 is about to be inserted into the receiving hole 14, FIG. 9 shows the state where the side deflector 13 has been fully inserted in the receiving hole 14 (without being fixed by the fixing member), and FIG. 10 shows the state where the side deflector 13 is about to be fixedly secured by using the fixing member.

The assembling of the side deflector 13 to the nut 7 is initiated by inserting the side deflector 13 into the nut 7 as shown in FIGS. 7 to 9. At this time, the worker aligns the grooves 42 formed in the nut 7 with the corresponding ridges 41 formed in the side deflector 13, and pushes the side deflector 13 into the receiving hole 14 in the insertion direction (as indicated by arrow A in FIG. 7 or in the extending direction of the grooves 42).

The limit of inserting the side deflector 13 into the receiving hole 14 is determined by the abutting of the front surface 23 of the side deflector 13 with the front surface 31 of the inner wall defining the receiving hole 14 (see Figure ii). Owing to this arrangement, by ensuring a required precision in the fitting of each ridge 41 into the corresponding groove 42 (the machining precision of the ridges 41 and the grooves 42) and the contact between the front surface 31 of the receiving hole 14 and the front surface 23 of the side deflector 13 (the machining precision of the front surface 31 and the front surface 23), the side deflector 13 can be positioned relative to the nut 7 at high precision without regard to the precision of the other surfaces of the inner wall defining the receiving hole 14 and the side deflector 13. The worker is enabled to position the side deflector 13 relative to the receiving hole 14 simply by inserting the side deflector 13 into the receiving hole 14. The length of each groove 42 in relation with the length of the corresponding ridge 41 (the positional relationship between the front part 41a of the ridge 41 and the front part 42a of the groove 42 when the side deflector 13 is fully inserted in the receiving hole 14) is not required to be particularly precise.

As shown in FIGS. 9 and 10, the side deflector 13 is fixedly secured to the nut 7 by using a cylindrical spring pin 61. This is accomplished by inserting the spring pin 61 into the fixing hole 55 opening out on the outer circumferential surface 22 of the side deflector 13 until the free end of the spring pin 61 reaches into the fixing hole 56 of the nut 7 opening out on the bottom surface 32 of the receiving hole 14 so that the spring pin 61 extends both in the fixing hole 55 of the side deflector 13 and the fixing hole 56 of the nut 7. See FIG. 11.

The spring pin 61 initially has a slightly larger outer diameter than the inner diameter of the fixing hole 55, but gets reduced in diameter in a resilient manner as the spring pin 61 passes through the narrowed portion 55a. Once the rear end of the spring pin 61 passes through the narrowed portion 55a, the spring pin 61 is allowed to expand to a diameter greater than the diameter of the narrowed portion 55a in a resilient manner, and closely contacts the inner circumferential surface of the fixing holes 55 and 56 with a resilient restoring force thereof for an effective fixing action. The front end of the spring pin 61 is provided with a chamfered part 61a or a tapered end so that the insertion of the spring pin 61 into the fixing hole 55 (the narrowed portion 55a) can be facilitated.

In the illustrated embodiment, the narrowed portion 55a was formed in the fixing hole 55 to serve as a stopper that prevents the spring pin 61 from moving out of the fixing hole 55. However, it is also possible to omit the narrowed portion 55a, and to prevent the spring pin 61 from moving out of the fixing hole 55 owing solely to the frictional force between the outer circumferential surface of the spring pin 61 and the inner circumferential surface of the fixing holes 55 and 56. The fixing hole 55 is not necessarily required to open out on the outer circumferential surface 22 of the deflector 13, and may open out only on the bottom surface 24 of the side deflector 13. In this case, the fixing member (such as a pin) may be initially placed in the fixing hole 56, and may be fitted into the fixing hole 55 such that the fixing member is kept fitted in the fixing hole 56 owing to a biasing force of a spring member or the like acting upon the fixing member when the side deflector 13 is fully received in the receiving hole 14.

In the illustrated embodiment, the limit of inserting the side deflector 13 into the receiving hole 14 is determined by the abutting of the front surface 23 of the side deflector 13 onto the front surface 31 of the inner wall defining the receiving hole 14. But, it is also possible to determine the insertion limit of the side deflector 13 by the abutting of the front pert 41a of the ridge 41 onto the front part 42a of the groove 42. In this case, only the ridges 41 and the grooves 42 are required to be finished at a high precision while the surfaces (including the front surface 23 and the front surface 31) of the side deflector 13 and the inner wall defining the receiving hole 14 are not required to be finished at such a high precision. In this case, some gaps may be created between the various surfaces 23 to 26 of the side deflector 13 and the corresponding surfaces 31 to 34 defining the receiving hole 14 when the side deflector 13 is inserted in the receiving hole 14 as long as the side deflector 13 can be positioned and fixedly secured to the nut 7.

Alternatively, the insertion limit of the side deflector 13 in the receiving hole 14 may not be determined by the abutting of a part of the side deflector 13 onto a corresponding part of the nut 7. In such a case, in the assembling process, with the side deflector 13 inserted into the receiving hole 14 to a prescribed depth (such that a gap small enough not to obstruct the circulation of the balls 8 may be created between the front surface 23 of the side deflector 13 and the front surface 31 of the inner wall defining the receiving hole 14), the spring pin 61 may be inserted into the fixing holes 55 and 56 so that the side deflector 13 can be fixedly secured in the prescribed position of the nut 7.

As shown in FIG. 11, when the assembling of the side deflector 13 to the nut 7 is completed, the outer circumferential surface 22 of the side deflector 13 conforms to (or slightly recessed with respect to) the outer circumferential surface of the peripheral wall 4. The lengthwise direction (the axial line X in FIG. 11) of the grooves 42 and the ridges 41 crosses the lengthwise direction of the fixing holes 55 and 56 (or the insertion direction of the spring pin 61). In the illustrated embodiment, the angle $\theta$ between the axial line X and the axial line Y is 90 degrees. However, this angle $\theta$ may also be any other angle as long as the axial line X and the axial line Y are not parallel to each other. The fixing holes 55 and 56 extend at an angle to the radial direction of the nut 7. Thereby, when the nut 7 is rotating, the centrifugal force is prevented from acting directly in the direction (removing direction) opposite to the insertion direction of the spring pin 61.

By forming the fixing holes 55 and 56 such that the fixing holes 55 and 56 extend at an angle to the direction along which the grooves 42 and the ridges 41 extend (the insertion direction of the side deflector 13), the side deflector 13 can be easily prevented from moving in the removing direction of the spring pin 61 so that the side deflector 13 can be fixedly secured to the nut 7 in a stable manner. A plurality of fixing members (such as the spring pin 61) may be used for fixedly securing the side deflector 13 to the nut 7, but in the illustrated embodiment, the side deflector 13 can be fixedly secured in a stable manner only with the single spring pin 61 because the movement of the side deflector 13 in the removing direction of the spring pin 61 is favorably restricted.

The fixing member for fixedly securing the side deflector 13 is not limited to the spring pin 61, but may also consist of other per se known fixing members such as a solid pin, a screw and a bolt. The use of a pin (such as a spring pin 61 and a solid pin) for the fixing member has the advantage of not requiring the fastening procedure so that the damage to the side deflector during the fastening or securing process can be avoided even when the side deflector is made of material such as plastic material having a lower rigidity than metallic material.

As shown in FIG. 12, when the assembling of the side deflector 13 to the nut 7 is completed, the bottom surface 24 of the side deflector 13 is exposed in the receiving hole 14 that opens out on the inner circumferential surface of the peripheral wall 4 of the nut 7. In this conjunction, the groove 51a of the side deflector 13 is continuously connected to the thread groove 6 of the nut 7 so that the balls 8 scooped up by the tongue 52 (or returned to the ball rolling passage 5 from the tongue 52) can be favorably guided.

(First Modified Embodiment)

Figure 13:
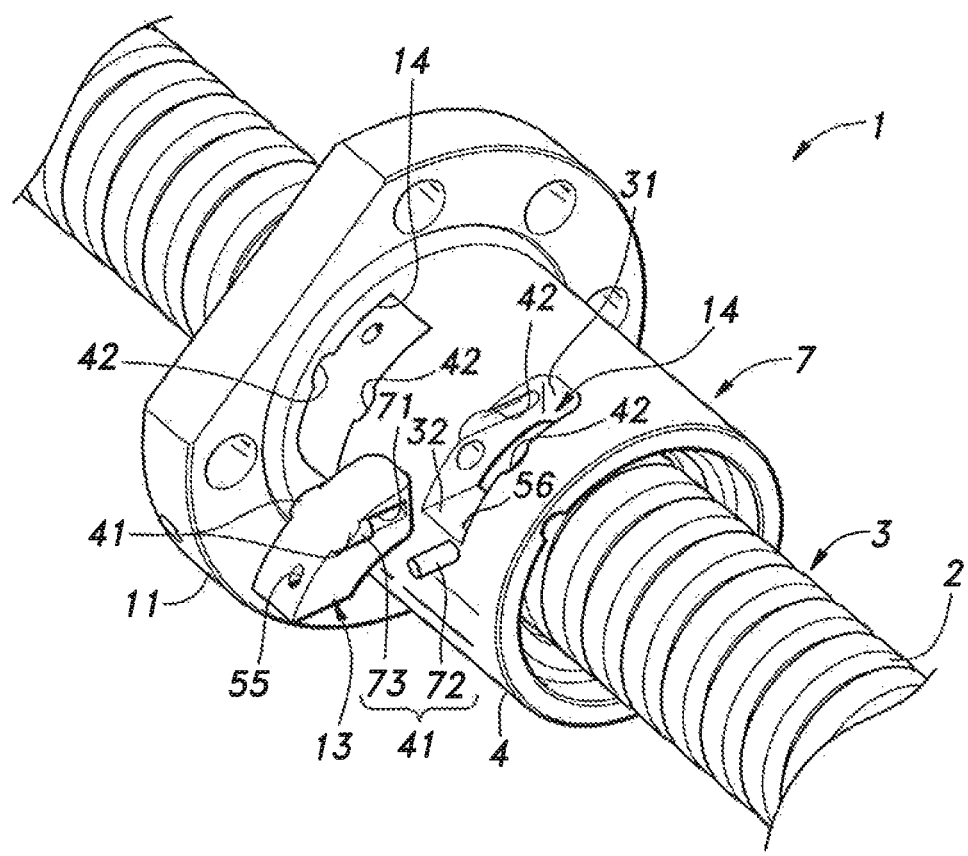
FIG. 13 is a fragmentary exploded perspective view of a ball screw of a first modified embodiment.

FIG. 13 is a fragmentary perspective view showing the side deflectors of the first modified embodiment. In FIG. 13, the parts corresponding to those of the preceding embodiment are denoted with like numerals. The parts of the first modified embodiment similar to those of the preceding embodiment are omitted from the following description except for the subject matters discussed in the following description.

In the first modified embodiment, the ridge 41 (a part of the ridge in this case) consists of a member detachable from the main body. More specifically, a semi-cylindrical recess 71 extending in the fore and aft direction is formed on each lateral side of the side deflector 13, and a half of a guide member 72 having a columnar shape is received in this recess 71. The rear part of the recess 71 is formed with a projection 73 having a similar configuration as the ridge 41 mentioned earlier so that the ridge 41 is formed jointly by the exposed part (half) of the guide member 72 and the projection 73 adjoining the rear end of the guide member 72.

By providing the projection 73 adjoining the rear end of the recess 71 in the side deflector 13, the guide member 72 is prevented from being dislodged from the recess 71. Here, the projection 73 is not entirely indispensable, and the projection 73 can be omitted so that the recess 71 is extended rearward to the outer circumferential surface 22 as an alternate embodiment.

In the ball screw 1 of the first modified embodiment, it suffices if at least the part of the ridge 41 formed by the guide member 72 is able to guide the insertion of the side deflector 13 into the receiving hole 14. As the guide member 72 forming the ridge 41 can be readily replaced, it is possible to adjust the state of engagement (the precision associated with the insertion of the side deflector 13 into the receiving hole 14) between the ridge 41 and the groove 42 with ease.

(Second Modified Embodiment)

Figure 14:
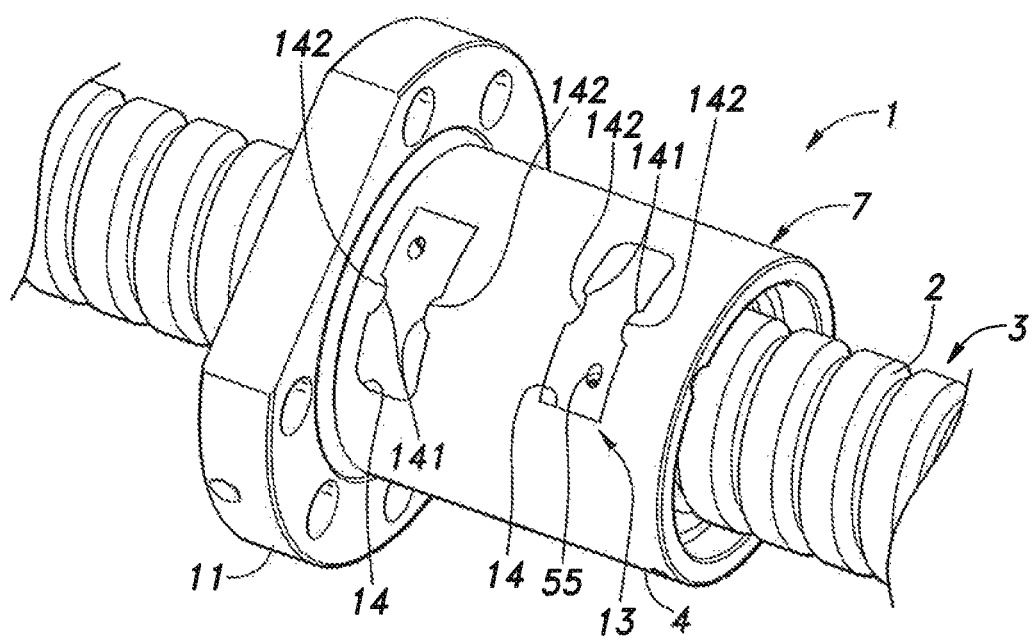
FIG. 14 is a fragmentary perspective view of a ball screw of a second modified embodiment.

FIG. 14 is a fragmentary perspective view showing the ball screw of the second modified embodiment. In FIG. 14, the parts corresponding to those of the preceding embodiments are denoted with like numerals. The parts of the second modified embodiment similar to those of the preceding embodiments are omitted from the following description except for the subject matters discussed in the following description.

The ball screw 1 of the second modified embodiment differs from the preceding embodiments in the structure of the member (the guide member and the corresponding guide member) for guiding the insertion of the side deflector 13 into the receiving hole 14. As shown in FIG. 14, in this ball screw 1, a pair of grooves 142 similar to the grooves 42 of the nut 7 of the preceding embodiments are formed on either side surface of the side deflector 13. Meanwhile, the inner wall of the receiving hole 14 of the nut 7 is formed with a pair of ridges 141 similar to the ridges 41 of the side deflector 13 of the preceding embodiments.

Thus, in the ball screw 1 of the second modified embodiment, the ridges 41 formed in the side deflector 13 and the grooves 42 formed in the nut 7 in the preceding embodiments are formed in the interchanged members so that the insertion of the side deflector 13 in the receiving hole 14 is guided by the ridges 141 formed in the nut 7 and the grooves 142 formed in the side deflector 13.

(Third Modified Embodiment)

Figure 15:
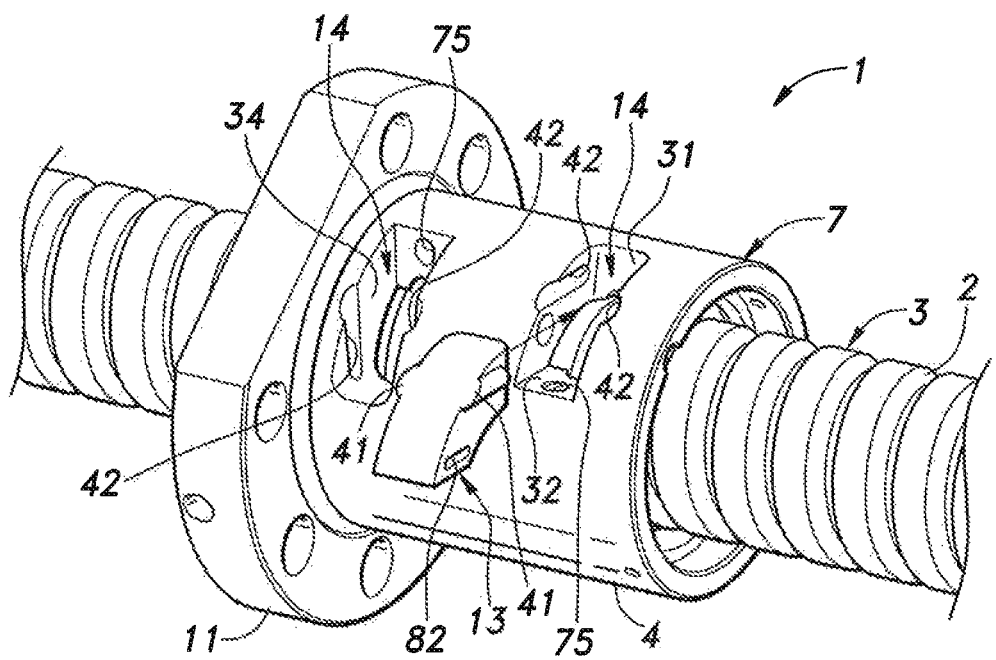
FIG. 15 is a fragmentary exploded perspective view of a ball screw of a third modified embodiment.
Figure 16:
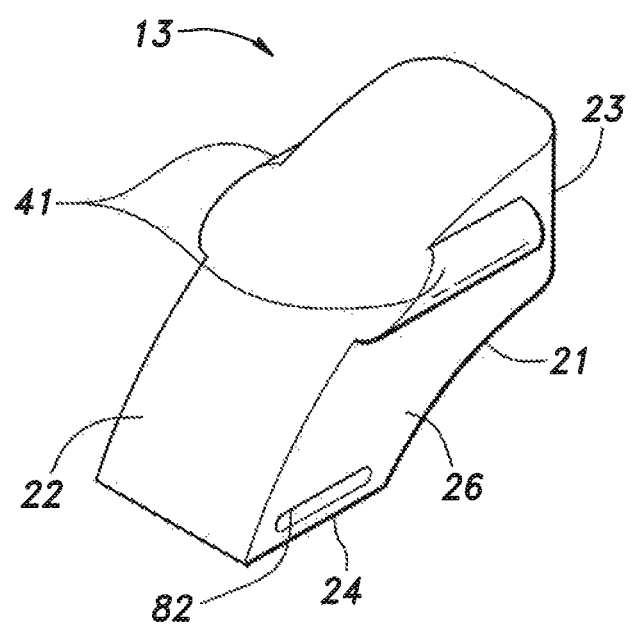
FIG. 16 is a perspective view showing the outer circumferential surface side of the side deflector of the third modified embodiment.
Figure 17:
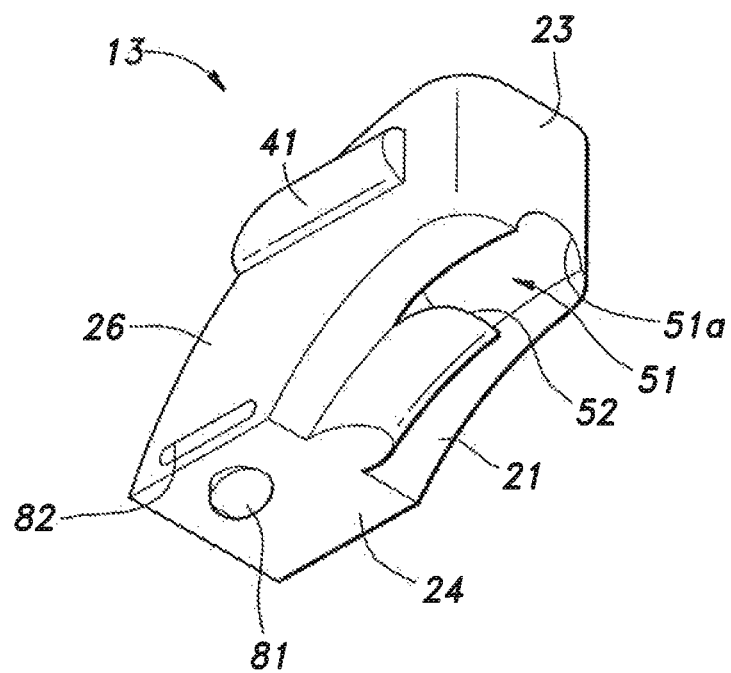
FIG. 17 is a perspective view showing the inner circumferential surface side of the side deflector of the third modified embodiment.

FIG. 15 is an exploded perspective view showing the ball screw of the third modified embodiment. FIGS. 16 and 17 are perspective views of the side deflector of the third modified embodiment showing the outer circumferential surface side and the inner circumferential surface side, respectively. FIG. 18 is a side view of the side deflector of the third modified embodiment. The parts of the third modified embodiment similar to those of the preceding embodiments are omitted from the following description except for the subject matters discussed in the following description.

The ball screw 1 of the third modified embodiment differs from the preceding embodiments in the fixing structure for fixedly securing the side deflector 13 to the nut 7. As shown in FIG. 15, an engagement opening 75 for engaging the side deflector 13 opens out on the bottom surface 32 of the receiving hole 14, instead of the fixing hole 56. Furthermore, as shown in FIGS. 17 and 18, the bottom surface 24 of the side deflector 13 is formed with an engagement claw 81 projecting downward from the bottom surface 24.

As shown in FIG. 17, the engagement claw 81 is provided with a circular shape in bottom view, and an inverted triangular shape projecting progressively downward from the front part to the rear part thereof in side view. A slot 82 having an elongated circular shape extending in the longitudinal direction is formed in a part of the side deflector 13 located above the engagement claw 81. The slot 82 opens out at least on the right side surface 26 of the side deflector 13, and extends leftward in the lateral direction by a prescribed depth at least exceeding the position of the engagement claw 81.

As shown in FIG. 15, when the side deflector 13 is inserted into the receiving hole 14, the engagement claw 81 is pushed upward as the engagement claw 81 slides over the bottom surface 32 of the receiving hole. At this time, owing to the presence of the slot 82, the engagement claw 81 is allowed to resiliently deform upward. Thereafter, as the engagement claw 81 is fitted into (or is engaged by) the engagement opening 75, the engagement claw 81 regains the original position in a resilient manner. The slot 82 may be modified in shape and/or position as long as at least the space required for the elastic deformation of the engagement claw 81 is ensured.

Owing to this arrangement, no special fixing member is required to fixedly secure the side deflector 13 to the nut 7, and the side deflector 13 can be fixedly secured to the nut 7 simply by inserting the side deflector 13 into the receiving hole 14. This arrangement has the advantage of allowing the side deflector to be fixedly secured to the nut even when the size of the side deflector is reduced to such an extent that no space is available for the fixing hole to be formed.

The present invention has been described in terms of specific embodiments, but these embodiments are merely exemplary, and do not restrict the scope of the present invention in any way. For instance, each side deflector consisted of a single member, but may also be formed by two or more members. The use of a fixing member (such as the pin) or a fixing portion (such as the engagement claw) for fixedly securing the side deflector to the nut is not essential for the present invention, and it is also within the purview of the present invention to press fit the side deflector into the receiving hole of the nut. The illustrated embodiments of the present invention were applied to both of the two side deflectors, but it is also possible to apply the present invention to only one of the side deflectors. And, the various components of the ball screw appearing in the illustrated embodiments are not entirely essential for the present invention, and may be partly omitted and/or substituted without departing from the spirit of the present invention.

Glossary 1 ball screw
2 thread groove
3 screw shaft
4 peripheral wall
5 ball rolling passage
6 thread groove
7 nut
8 ball
12 ball return passage
13 side deflector (circulation member)
14 receiving hole
21 inner circumferential surface
22 outer peripheral surface
23 front surface (corresponding contact portion)
24 bottom surface
25 left side surface
26 right side surface
31 front surface (contact portion)
32 bottom surface
33 left side surface
34 right side surface
41, 141 ridge (corresponding guide portion)
42, 142 groove (guide portion)
42a front part
51 circulation passage
52 tongue
53 ball rolling passage
55 fixing hole (second fixing hole)
56 fixing hole (first fixing hole)
61 spring pin
71 recess
72 guide member
73 projection
75 engagement opening
81 engagement pawl
82 slot

The invention claimed is:

1. A ball screw, comprising:
a screw shaft having a thread groove formed on an outer circumferential surface thereof;
a nut having a cylindrical peripheral wall, a thread groove formed on an inner circumferential surface of the peripheral wall to define a ball rolling passage jointly with the thread groove of the screw shaft, a ball return passage extending in the peripheral wall to connect two ends of the ball rolling passage with each other and at least one receiving hole formed in the peripheral wall;
a circulation member inserted in the receiving hole and defining a circulation passage for connecting an end of the ball rolling passage with a corresponding end of the ball return passage; and
a plurality of balls received in a ball passage jointly formed by the ball rolling passage, the ball return passage and the circulation passage;
wherein an inner wall of the receiving hole of the nut is formed with at least one guide portion configured to cooperate with a corresponding guide portion formed in the circulation member for guiding an inserting movement of the circulation member into the receiving hole in an insertion direction crossing a radial direction of the nut; and
wherein one of the guide portion and the corresponding guide portion comprises a groove extending in the insertion direction, and the other of the guide portion and the corresponding guide portion comprises a projection that engages the groove in a slidable manner in the insertion direction.

2. The ball screw according to claim 1, wherein the nut is further provided with at least one contact portion for defining an insertion limit of the inserting movement of the circulation member into the receiving hole in cooperation with a corresponding contact portion provided on the circulation member.

3. The ball screw according to claim 1, wherein the peripheral wall is formed with a first fixing hole extending at an angle to the insertion direction and opening out into the receiving hole, and the circulation member is formed with a second fixing hole communicating with the first fixing hole in the receiving hole when the circulation member is inserted into the receiving hole, the ball screw further comprising a fixing member passed from the first fixing hole to the second fixing hole.

4. The ball screw according to claim 3, wherein the first fixing hole and the second fixing hole extend at angle to the radial direction of the nut.

5. The ball screw according to claim 1, wherein the projection consists of a ridge extending in the insertion direction.

6. The ball screw according to claim 1, wherein the projection is formed by a part of a guide member fitted into a recess provided in the other of the guide portion and the corresponding guide portion.

7. The ball screw according to claim 1, wherein the guide portion is formed on each of a pair of sides of the receiving hole that oppose each other in the axial direction, and the corresponding guide members are provided on either side of the circulation member so as to correspond to the guide portions.

8. A ball screw, comprising:
a screw shaft having a thread groove formed on an outer circumferential surface thereof;
a nut having cylindrical peripheral wall, a thread groove formed on an inner circumferential surface of the peripheral wall to define a ball rolling passage jointly with the thread groove of the screw shaft, a ball return passage extending in the peripheral wall to connect two ends of the ball rolling passage with each other and at least one receiving hole formed in the peripheral wall;
a circulation member inserted in the receiving hole and defining a circulation passage for connecting an end of the ball rolling passage with a corresponding end of the ball return passage; and
a plurality of balls received in a ball passage jointly formed by the ball rolling passage, the ball return passage and the circulation passage;
wherein the nut is formed with at least one guide portion configured to cooperate with a corresponding guide portion formed in the circulation member for guiding an inserting movement of the circulation member into the receiving hole in an insertion direction crossing a radial direction of the nut;
wherein one of the guide portion and the corresponding guide portion comprises a groove extending in the insertion direction, and the other of the guide portion and the corresponding guide portion comprises a projection that engages the groove in a slidable manner in the insertion direction; and wherein an engagement claw is formed in one of an inner wall of the receiving hole and the circulation member, and an engagement opening is formed in the other of the inner wall of the receiving hole and the circulation member in such a manner that the engagement claw is engaged by the engagement opening owing to an elastic deformation of at least a part of the circulation member when the circulation member is inserted into the receiving hole.

\* \* \* \* \*